April 5, 1955      J. T. KANEMOTO      2,705,771
MOTOR OPERATED TRIP PULL MECHANISM
Filed March 31, 1952
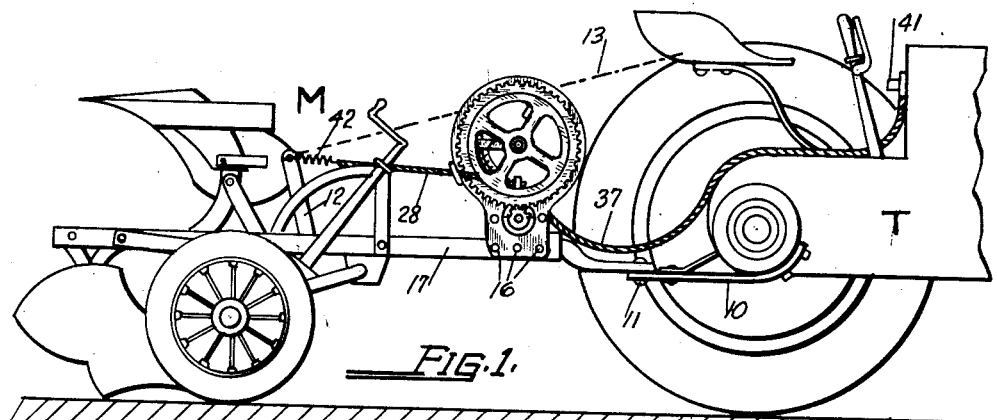
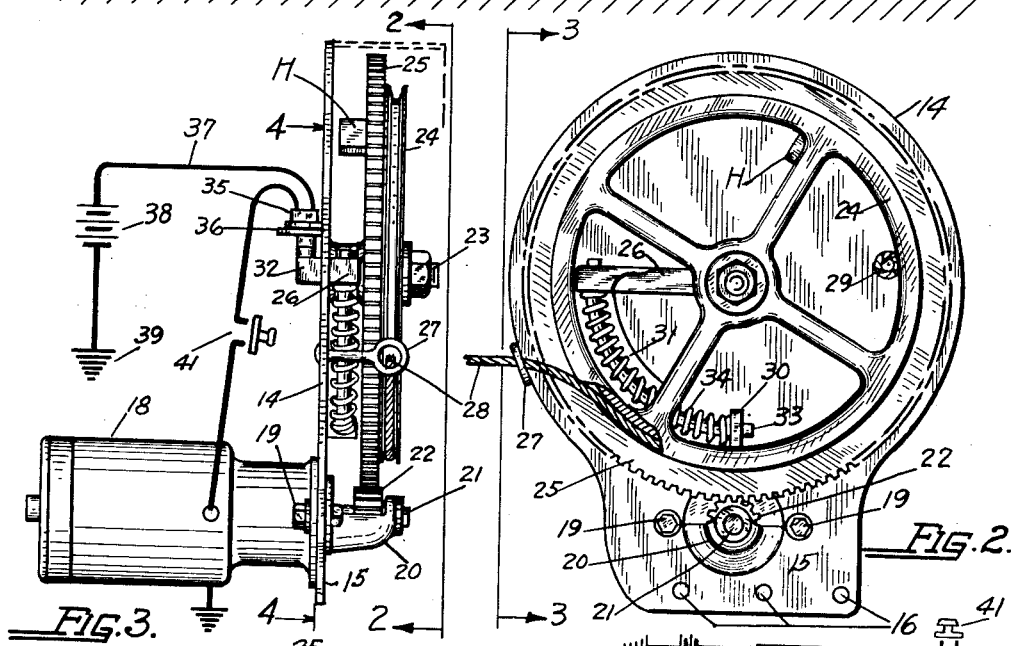
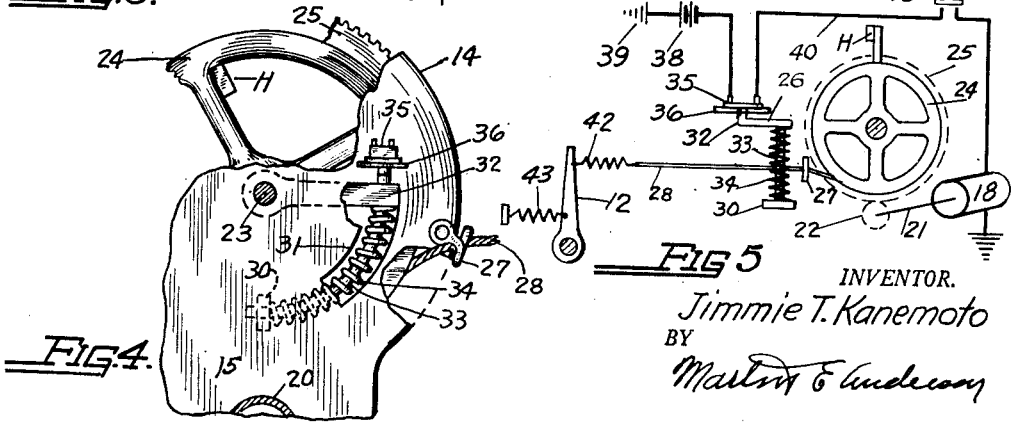
INVENTOR.
Jimmie T. Kanemoto
BY
Martin E. Anderson
ATTORNEY ated Apr. 5, 1955

United States Patent Office 2,705,771
Patented Apr. 5, 1955

2,705,771

MOTOR OPERATED TRIP PULL MECHANISM

Jimmie T. Kanemoto, Longmont, Colo.

Application March 31, 1952, Serial No. 279,529

5 Claims. (Cl. 318—466)

This invention relates to improvements in electric trip pull mechanisms and will be explained with relation to its use on tractor operated earth working machines, for the purpose of illustration.

In many places it is necessary to exert a strong pull for a short time on a movable object, as for example to release a detent or a trigger of the type used with farm machinery; to open doors or gates that are held in closed position by weights or springs.

Practically all farm tractors are to-day provided with high pressure oil pumps that operate hydraulic rams which perform various operations formerly performed by the operator. As an example reference will be had to tractor drawn plows and cultivators which require the ground working tools to be raised at the ends of the furrows or rows and again lowered. Many ground working farm machines are provided with a clutch and detent controlled mechanism that receives its power from the wheels of the implement and are so constructed that one pull on a trip rope connected with a control lever or trigger activates the mechanism to raise the plow bottoms into elevated position where they are held by a latch comprising a pawl, and another pull on the trip rope lowers the plows. As an example of such mechanisms reference is made to a book entitled "McCormick Tractor Plows" (page 9).

All farm tractors above the size known as garden tractors are provided with electric generators for operating the ignition, the lights and for other purposes.

It is the object of this invention to produce an electrically operated mechanism that can be applied to a tractor drawn farm implement by means of which the operator, by the simple expedient of closing a switch, can activate a mechanism located on the implement to move a member or mechanism or tool from operative to inoperative position and thereafter release said mechanism.

The above and other objects that may appear as this description proceeds are attained by means of a mechanism that will now be described in detail, for which purpose reference will be had to the accompanying drawing in which the invention has been illustrated and in which:

Figure 1 is a side elevational view showing in a general way, the manner in which the tractor and the ground working machine are connected and showing also the general arrangement of the trip operating device and the trip control means;

Figure 2 is a side elevation of the operating device, looking in the direction of arrows 2—2 in Figure 3;

Figure 3 is an edge view looking in the direction of arrows 3—3 in Figure 2;

Figure 4 is a fragmentary view looking along line 4—4 in Figure 3, portions being shown in section, and Figure 5 is a diagram showing the relationship of the parts.

Referring now to the drawing T represents an ordinary farm tractor and M a ground working machine which in this case has been shown as a roll over two way plow and is merely illustrative of the type of machine to which this inventions relates.

The tractor is provided with the ordinary draw bar 10 to which the machine is attached by some suitable means such as a pin 11.

The ground working machine is provided with one of the several tool lifting and latching mechanisms in general use, one of which has been identified in the above part of this specification and which is manufactured by the McCormick Harvester Co. This device has a trigger release lever 12. A trip rope 13 is usually connected to the release lever and to the tractor. One pull on this trip rope sets the lifting device into action thereby raising the plow bottoms and latching them in raised position. A second pull on the trip rope releases the plow bottoms which then quickly return to their operative position.

The apparatus that forms the subject of this invention takes the place of the trip rope whose operation at turns and at the ends of furrows and rows consumes much of the operator's strength and attention at a time when he is fully occupied by guiding the tractor.

The construction and operation of the device that forms the subject of this invention will now be described.

A steel plate 14 forms the base of the mechanism and may have almost any shape but has been shown as circular with a downwardly extending portion 15 which has several holes 16 for the reception of bolts by means of which the device is attached to frame member 17 of the machine. An automobile starting motor 18 is attached to the rear surface of plate 14 by bolts 19 and has a part 20 that extends through the plate in the manner shown most clearly in Figure 3. The motor shaft 21 carries a pinion 22. A stub shaft 23 is welded or otherwise attached to plate 14 and carries a grooved pulley 24 to the edge of one side flange a ring gear 25 is attached by welding. In the commercial embodiment the ring gear may be an integral part of the pulley.

A lever 26 has its inner end journaled on shaft 23 for limited angular movement and serves to space the pulley and ring gear outwardly from the surface of plate 14, as shown in Figure 3. The parts are so positioned and proportioned that when the pulley is in place on the shaft the ring gear will mesh with the pinion.

The motor is so wound that it will rotate in a clockwise direction (Fig. 2) when it is energized and therefore whenever the motor is activated it will turn the pulley and ring gear in a counterclockwise direction when viewed as in Figure 2. When the motor is inoperative the ring gear and pulley may be turned in either direction because the armature of the motor can then turn quite freely.

To the edge of plate 14 a guide loop 27 is attached and a rope or steel cable 28 passes through the guide loop and after passing through a hole in the bottom of the pulley groove is tied into a knot 29.

Attached to the outer surface of plate 14 is an abutment 30. Plate 14 has a short arcuate opening 31 and lever 26 has a rearwardly projecting end 32 that extends through opening 31 and terminates a short distance to the rear of the plate. An arcuate bar 33 whose center of curvature is the center of shaft 23, has its upper end rigidly connected with the outer end of lever 26, as by being welded to it, and extends through a hole in abutment 30, as shown in Figures 2 and 4. One of the spokes of the pulley carries a hammer H which will strike the upper surface of lever 26 moving it downwardly against the force exerted by spring 34 which therefore serves as a yielding abutment. A normally closed switch 35 rests on a shelf 36 that is welded or otherwise affixed to plate 14. Switch 35 is held in closed position by the pressure of head 32. A conductor 37 extends from switch 35 to one pole of battery 38 which is grounded at 39. A conductor 40 extends from switch 35 to the motor and this conductor has a normally open switch 41. Cable 28 is provided at its end with a tension coil spring 42 which is connected with the end of release lever 12 as shown in Figures 1 and 5. Spring 43 represents a force tending to turn release lever 12 counterclockwise.

Let us now assume that the parts are in the position shown in Figure 5 and that the operator closes switch 41, the motor starts rotating in a clockwise direction and turns pulley 24 in a counterclockwise direction until hammer H engages 26 whereupon switch 35 opens and the motor stops. The operator then removes his pressure on switch 41 thereby deenergizing the motor whereupon spring 43, acting through cable 28, rotates pulley 24 in a clockwise direction. Spring 34 thereupon returns lever 26 to its normal position and closes switch 35 and the parts are ready for another cycle.

From the above it will be apparent that the operator from his seat on the tractor can raise and lower the ground working tools by closing switch 41 which is conveniently located, instead of, as formerly, reaching back and exerting a pull on trip rope 13. Since the electric motor mechanism operates instantly when switch 41 is closed and is automatically stopped at the end of a predetermined movement the operator is free to guide the tractor.

Although an automobile starting motor has been shown it is to be understood that any equivalent electric motor mechanism may be substituted so long as the motor armature is arranged to exert a pull and move a tension member through the required distance.

What is claimed as new is:

1. A mechanism for effecting oscillatory movement of a member between a normal and second position at the will of an operator located at a distance comprising, a base, a motor device comprising an electromagnet attached to the base, an armature operatively associated with the magnet for movement in one direction in response to magnetic force when the magnet is energized, means comprising a spring operatively attached to the oscillating member for returning the armature and said member to their normal positions after each energizing of the magnet, a source of current connected with the magnet by an electrical conductor, two switches connected in series in said conductor, one of said switches being normally open and the other normally closed by means comprising a spring, whereby when the other switch is closed the armature will move, means for opening the normally closed switch when the armature has moved a predetermined distance whereby the electromagnet will be de-energized, and means for transmitting movement from the armature to the member to be operated when the armature moves in response to the force exerted thereon by the magnet.

2. A device for use in effecting oscillatory movement of a member positioned at a distance, comprising a base, an electric motor attached to the base, a pinion attached to the motor shaft, a spur gear pivoted on the base in position to mesh with the pinion, a cable connected between said spur gear and the oscillating member, a tension spring operatively connected to the oscillating member tending to force said member in a direction opposite to that force exerted by the cable, a normally closed switch attached to the base and connected in the motor circuit, a lever pivoted to the base the lever having its free end in operative engagement with the switch carried by the base, means comprising a spring urging the end of the lever against the switch to hold it in closed position, and means responsive to the rotation of the spur gear by the motor for moving the pivoted lever against the spring acting on it, to a position in which the switch controlled thereby opens.

3. In combination, a tractor-drawn ground-working machine in which the frame is operatively connected to the draw bar of the tractor, said machine being of the type having ground-working tools attached thereto provided with means for moving the tools vertically with respect to the frame by power derived from a drive wheel of the machine, means comprising a detent for automatically latching the tools in elevated non-operative position, means for releasing said detent comprising a trigger release lever actuated by a forwardly acting pull thereon, and means for exerting said pull comprising, a rotatable drum mounted on the frame adjacent to the tractor, a flexible cable attached to the trigger release lever and to said drum, means comprising an electric motor operatively connected to the drum for rotating it in a direction to exert a pull on the trigger release lever, means comprising an electric circuit connecting the motor to a source of electric power, a normally closed switch connected in series with the motor, means on the drum for opening said switch when the drum is rotated, a manually operated normally open switch on the tractor in series with the motor and the normally closed switch, said normally open switch positioned to be closed by the tractor operator to complete the motor circuit whereby the motor functions to rotate the drum which exerts a pull on the trigger release lever thereby raising the tools into nonoperative position at which time the normally closed switch is opened by means controlled by the rotation of the drum and the normally open switch is opened, resilient means attached to the trigger release lever for returning the drum and cable to their original positions thereby closing the normally closed switch, whereupon a second closing of the manually operated switch will cause the parts to cooperate in the same manner to pull the trigger release lever and release the tools into operative position.

4. An electrically operated device for use in actuating the lift mechanism on tractor-drawn wheel-supported ground-working machines having a trigger release lever and a frame comprising, a base attached to the frame, a circular plate attached to the base, a stub shaft centrally located in the plate on which a grooved pulley is mounted for rotation, a connecting cable having one end attached to the periphery of the grooved pulley and the other end to the trigger release lever, a motor circuit containing a source of electric power and an electric motor operatively connected to the grooved pulley for rotation in a direction to exert a pull on the trigger release lever by means comprising a connecting cable, a normally closed switch mounted on the plate which is connected in series in the motor circuit, a manually operated normally open switch attached to the tractor in series with the motor and the normally closed switch, means comprising a lever with its inner end journaled for angular movement on the stub shaft, a compression spring attached at one end to the outer end of lever and having the other end secured to an abutment on the grooved pulley by which the normally closed switch is held in closed position, a hammer positioned on the grooved pulley to engage the lever and open the normally closed switch when the grooved pulley is rotated, and a tension spring attached to the frame and to the trigger release lever tending to rotate the grooved pulley against the action of the motor.

5. An electrically operated limit switch mechanism for controlling the angular movement of a rotating member comprising, a base, a substantially circular plate attached thereto, a stub shaft projecting from the center of the plate, a rotating member mounted for rotation on said shaft, an electric circuit containing a motor, a manually operated normally open switch and a normally closed switch connected in series with a source of electric power, said motor being operatively connected with the rotating member, a lever journaled at its inner end for limited arcuate movement on the stub shaft, the outer end of said lever holding the normally closed switch in closed position by means comprising a compression spring having one end attached to the circular plate and the other end attached to the lower opposite the switch, a hammer mounted on the rotating member in a position to contact the lever upon rotation of said member through a predetermined arcuate distance, whereupon closing the normally open switch energizes the motor causing the rotating member to turn until the hammer contacts the lever forcing it away from the normally closed switch against the action of the compression spring thereby opening the circuit and preventing further rotational movement of the rotating member.

References Cited in the file of this patent

UNITED STATES PATENTS

| | | |
|---|---|---|
| 1,342,915 | Johnson | June 8, 1920 |
| 1,411,712 | Diehl | Apr. 4, 1922 |
| 2,102,070 | Harris | Dec. 14, 1937 |